United States Patent
Wiener-Avnear et al.

[19]

[11] Patent Number: 5,956,382
[45] Date of Patent: Sep. 21, 1999

[54] X-RAY IMAGING ARRAY DETECTOR AND LASER MICRO-MILLING METHOD FOR FABRICATING ARRAY

[75] Inventors: Eliezer Wiener-Avnear; James Earl McFall, both of Carlsbad, Calif.

[73] Assignee: Eliezer Wiener-Avnear, doing business as Laser Electro Optic Application Technology Comp., Carlsbad, Calif.

[21] Appl. No.: 08/937,552

[22] Filed: Sep. 25, 1997

[51] Int. Cl.$^6$ .................................................. G01T 1/20
[52] U.S. Cl. ................................... 378/98.8; 250/367
[58] Field of Search ............................. 378/98.8, 146, 378/195; 250/367, 368, 370.11

[56] References Cited

U.S. PATENT DOCUMENTS

| | | | |
|---|---|---|---|
| 3,936,645 | 2/1976 | Iversen | 250/486 |
| 4,011,454 | 3/1977 | Lubowski et al. | 250/483 |
| 4,069,355 | 1/1978 | Lubowski et al. | 427/70 |
| 4,473,513 | 9/1984 | Cusano et al. | 264/1.2 |
| 4,518,546 | 5/1985 | Greskovich et al. | 264/1.2 |
| 4,525,628 | 6/1985 | DiBianca et al. | 250/367 |
| 4,593,400 | 6/1986 | Mouyen | 378/99 |
| 4,672,207 | 6/1987 | Derenzo | 250/363 |
| 4,694,177 | 9/1987 | Akai | 250/368 |
| 4,747,973 | 5/1988 | Cusano et al. | 252/301.4 |
| 5,059,800 | 10/1991 | Cueman et al. | 250/367 |
| 5,109,159 | 4/1992 | Hagiwara et al. | 250/368 |
| 5,153,438 | 10/1992 | Kingsley et al. | 250/370.09 |
| 5,241,180 | 8/1993 | Ishaque et al. | 250/361 R |
| 5,276,328 | 1/1994 | Yoshida et al. | 250/368 |
| 5,302,423 | 4/1994 | Tran et al. | 427/555 |
| 5,313,066 | 5/1994 | Lee et al. | 250/370.09 |
| 5,334,843 | 8/1994 | Zeman | 250/486.1 |
| 5,382,798 | 1/1995 | Mouyen | 250/370.11 |
| 5,418,377 | 5/1995 | Tran et al. | 250/483.1 |
| 5,519,227 | 5/1996 | Karellas | 250/483.1 |

OTHER PUBLICATIONS

Eliezer Wiener–Avnear "Lasers cut microscopic paths with major potential", Jul. 1993, Laser Focus World, pp. 75–80.
Eliezer Wiener–Avnear "Lasers micromachining in the aerospace industry—relevance to biomedical applications", Jan. 1993, presented at SPIE Biomedical Conference, Los Angeles, SPIE 1882, 374–381.

*Primary Examiner*—David P. Porta
*Attorney, Agent, or Firm*—Brown, Martin, Haller & McClain, LLP

[57] ABSTRACT

An x-ray focal plane array (XFPA) detector is fabricated by a laser micro-milling method under strict process control conditions. The detector has an array of phosphor pixels bonded together with a light reflective adhesive filling the grooves between adjacent pixels. The phosphor array is bonded on top of a visible detector array, either directly or via a light guiding structure, such that each phosphor pixel is aligned with a corresponding visible detector pixel. The phosphor array is fabricated by moving a phosphor substrate relative to a laser beam of predetermined intensity at a controlled, constant velocity along a predetermined path defining a set of grooves between adjacent pixels so that a predetermined laser flux per unit area is applied to the phosphor material, and repeating the movement for a plurality of passes of the laser beam until the grooves are ablated to a desired depth.

31 Claims, 5 Drawing Sheets

X-RAY IMAGING ARRAY DETECTOR AND LASER MICRO-MILLING METHOD FOR FABRICATING ARRAY

The U.S. Government has rights in this invention pursuant to contract NAS 1-97057 awarded by the U.S. Department of Defense under the Small Business Innovation Research (SBIR) Program.

BACKGROUND OF THE INVENTION

The present invention is generally concerned with x-ray or radiographic imaging systems and methods, and is particularly concerned with a method of fabricating a high performance X-ray focal plane array (XFPA) detector for integration in such a system, as well as an imaging system and method employing the detector.

An ongoing goal of medical and other diagnostic sciences is the development of a low-cost, high quality, high resolution, real-time digital imaging system for x-rays transmitted through an opaque target, such as the human body. Such a system has the capability of providing on-line, non-invasive, multi-organ radiographic imaging. Such real-time digitized imaging eliminates the need for film, and the time required to develop such film. Unfortunately, directly digitized detection of an X-ray image is a problem because silicon used in the pixels of visible focal plane digitizing arrays or visual matrix detectors, such as charge coupled devices (CCDs), has low responsivity and is also damaged by X-rays.

It is known to place a fluorescent or phosphorescent medium between the X-ray source and a visual matrix detector to convert the X-rays to visible light. There are still problems in using a screen of such material in front of the visual matrix detector. For example, if the screen is too thin, not enough of the X-rays will be absorbed and some will reach and damage the silicon in the matrix detector. If the screen is too thick, the induced fluorescence visible light is radiated in all directions and is also scattered, enlarging the area of the illuminated point source on the detector, thus blurring the picture and reducing the spatial image resolution. In some cases, scattered light may escape without reaching the matrix detector at all. The fluorescent or phosphorescent material may also have non-uniform properties, degrading the image quality and resolution. Some phosphorescent materials exhibit "after-glow", in other words they may continue to emit light even after the radiation source is no longer present. This may further degrade the image quality.

U.S. Pat. No. 5,519,227 of Karellas describes a structured scintillation screen which overcomes some of these problems. Regions of a transparent or semi-transparent scintillating substance are ablated to form an array of individual pixels. Each pixel is surrounded with an optically inactive material having a lower refractive index, so that the pixel is made to function as an optical waveguide. This confines the x-ray induced phosphorescence to the individual pixels and channels it to the detector. This increases resolution and detection efficiency. The method of fabrication is as follows: The substrate of phosphorescent or optically active material is exposed to electromagnetic radiation, such as a laser beam, so as to ablate the substrate in exposed regions to produce a one or two dimensional array of pixels. A mask may be placed in contact with the substrate so that the desired regions are ablated by the laser beam. Following laser processing to form the pixels, the pixels are surrounded by an optically inactive interstitial material so as to avoid optical leakage from each pixel. The pixel structure is attached via a substrate to a detector such as a CCD camera.

Other XFPA medical imagers have also been proposed, and have been introduced commercially in recent years, particularly for dental examinations. However, these imagers have, up to now, been very expensive and demonstrate marginal performance, due to the significant challenges in developing of a high performance, two dimensional XFPA detection matrix. One of the problems is that in order to replace high-resolution film radiography, the pixelated detector must have high uniformity and almost zero defects, with a resolution approaching 20 lp/mm, for good performance. All current commercial XFPA systems have demonstrated inferior imaging quality as compared with state-of-the-art commercial X-ray films, due to lack of sufficient resolution and low signal/noise.

SUMMARY OF THE INVENTION

It is an object of the present invention to provide a new and improved laser micromilling method which is particularly useful for fabricating an XFPA detector. It is a further object of the invention to provide a new and improved XFPA detector radiographic imaging system.

According to one aspect of the present invention, a method for micro-milling a substrate to a predetermined depth is provided, which comprises the steps of directing a laser beam at a predetermined intensity at a surface of the substrate material, moving the substrate material relative to the laser beam at a constant velocity along a predetermined path so as to remove the surface of the substrate material along the path by application of a predetermined uniform flux per unit area, and repeating the relative movement of the substrate material until the material has been ablated to the predetermined depth.

Preferably, the substrate material is an X-ray fluorescent material selected from a group consisting of $CdWO_4$, $Bi_4Ge_3O_{12}$, $YAG:Eu^{+3}$, YAG:Ce, CSI(Tl), CSI(Na), CSI, NaI, CsF, CaF(Eu), LiI(Eu), and $Gd_2SiO_5Ce$. In a preferred embodiment of the invention, the focus and intensity of the laser beam is varied as the depth of the ablated groove increases, in a manner to keep the energy introduced into the material at a constant flux per unit area, or energy per unit time per unit area. This helps to ensure that a relatively smooth-sided groove is produced, and also that the adjacent material is not degraded or damaged by introduction of too much energy. The flux per unit area to be applied, in other words the power passing into the surface, is precisely determined, dependent on the melting point, opacity, and other critical properties of the material so that just enough energy is applied to ablate the material in the desired region without spreading outwardly from that region and potentially degrading adjacent pixels. The power or flux per unit area is controlled by means of the selected constant relative velocity, and the laser beam intensity at the laser focusing point. All of these may be adjusted to achieve the predetermined flux per unit area.

Preferably, a series of grooves are micro-milled in the substrate material in an x-y grid pattern to form a reticulated pixel structure with kerfs or grooves separating the pixels. The grooves are then filled with glue material. The glue or adhesive material is preferably substantially reflecting the visible light, so as to optically isolate each pixel from adjacent pixels. The resultant pixelated substrate may be attached to a visible pixelated detector, such as a CCD (charge coupled device) detector or other visual matrix detector. In this way, x-rays incident on the pixel array of fluorescent or phosphorescent material will be converted to light rays, and these will be transmitted along each pixel to the underlying corresponding visible detecting pixel.

The laser micro-milling technique, in which the laser travels at constant velocity along each groove numerous times with a constant and/or controlled intensity to ensure uniform flux application per unit area gradually ablating the material to a greater and greater depth along each groove, ensuring that the groove walls will be relatively smooth and uniform. Control of the laser focus and intensity helps to ensure smoothness of the walls. This technique enables crystals with high quality specular optical properties to be used in an XFPA detector, without decomposition of the crystal material due to laser ablation, since the laser beam is not directed continuously on any one position of the crystal for an extended time period. The smooth optical finishing of the pixel walls as a result of the careful control of the laser processing helps to prevent any escape of light out of the individual pixels for internal light sources. Such loss is also prevented by the reflective glue material filling the grooves or gaps between adjacent pixels. The walls or sides of the pixels may alternatively or additionally be coated with a highly reflective metal layer prior to introduction of the glue or the glue may be mixed with metal spheres.

Preferably, the laser in the micro-milling process is controlled to be switched on only when the relative movement between the laser and target or substrate has reached a constant velocity. Additionally, the laser preferably has a continuous pulsed output, and the first, large pulse when the laser is first switched on is "killed" or removed in a conventional manner, to ensure that only uniform intensity laser pulses are impinged on the target. The relative velocity and pulse timing is such that adjacent laser pulses overlap to form a continuous groove along each desired line in the x and y direction.

In one embodiment of the invention, a metal layer is deposited on top of the substrate prior to formation of the pixels. The metal layer will then be reticulated along with the substrate to form individual pixels each with a thin metal layer on top. The metal layer will be transparent to X-rays while reflecting any scattered light back into the crystal and increasing optical isolation of the individual pixels. Alternatively, the metal layer may be deposited on top of individual pixels after the reticulation process is completed.

The completed, pixelated array is then attached either directly or via a faceplate to a visible light pixelated detector aligning the corresponding visible detector pixels and fluorescent pixels to maintain good registration.

According to another aspect of the present invention, a detector for X-ray focal plane imaging is provided, which comprises an X-ray fluorescent substrate having a first surface and a second surface, the first surface having grooves defining an array of micro-milled light-guiding pixels, a light reflective material substantially filling the grooves between adjacent pixels, and an array of visible light detecting pixels coupled to said second surface of the substrate for receiving light emanating from the substrate pixels.

In a preferred embodiment, each X-ray fluorescent pixel has a light reflective material coating deposited on the first surface. In this way, light is reflected back into the respective pixels rather than being lost or scattering into adjacent crystals, reducing or eliminating cross-talk.

In a preferred embodiment of the invention, the X-ray fluorescent material is selected from the group consisting of $CdWO_4$, $Bi_4Ge_3O_{12}$, $YAG:Eu^{+3}$, $YAG:Ce$, $CSI(Tl)$, $CSI(Na)$, $CSI$, $NaI$, $CsF$, $CaF(Eu)$, $LiI(Eu)$, and $Gd_2SiO_5Ce$. These materials were selected based on their laser micro-milling performance and X-ray detection performance. All of the materials listed above are found to fulfill a great part of the required criteria for effective scintillator material, to be compatible with the laser micro-milling technique used to manufacture the reticulated array. Other materials with equivalent properties may alternatively be used in other embodiments of the invention.

In one embodiment of the invention, each of the x-ray fluorescent pixels has a layer of reflective material such as metal covering the first surface. This increases light collection efficiency within the pixel. X-rays are transmitted through the metal layer, but light generated within each pixel will be reflected back into the pixel if it is directed at the metal layer. The pixels are suitably bonded to the visible light detector array. In another embodiment of the invention, the phosphor or X-ray fluorescent material is bonded to a light guiding structure which in turn is bonded to the pixelated visible light detector. In this embodiment, the x-ray fluorescent material may be selected from the group consisting of $Gd_2O_2S:Tb$, $Gd_2O_2S:Pr,Ce,F$, $ZnCdS:Ag$; $Y_2O_2F:Eu$.

The method of this invention allows an XFPA detector to be fabricated with high aspect ratio grooves having high optical quality surfaces and little or no material degradation. This results in an XFPA detector structure producing high resolution electronic X-ray imaging with excellent imaging quality.

BRIEF DESCRIPTION OF THE DRAWINGS

The present invention will be better understood from the following detailed description of some preferred embodiments of the invention, taken in conjunction with the accompanying drawings, in which like reference numerals refer to like parts, and in which.

DESCRIPTION OF THE PREFERRED EMBODIMENT

Figure 1:
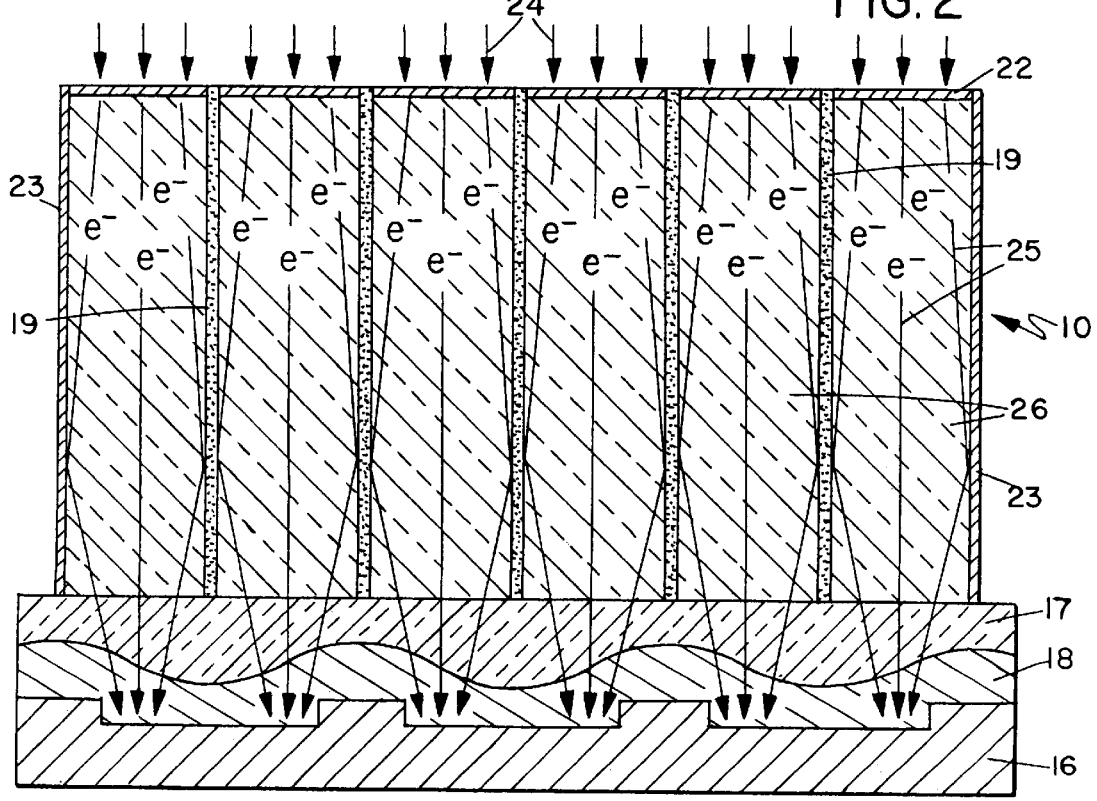
FIG. 1 is a schematic vertical cross-section through an X-ray focal plane array detector according to a first embodiment of the present invention.
Figure 4:
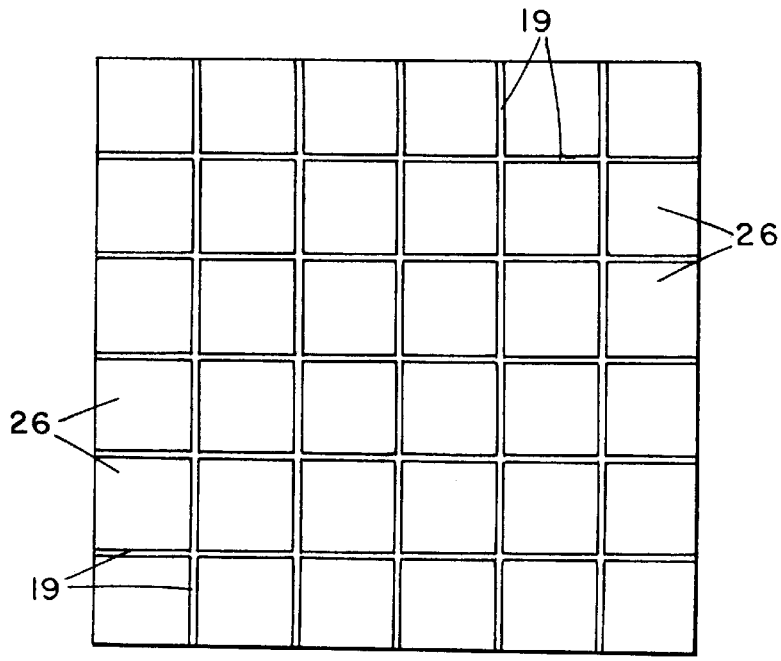
FIG. 4 is a top plan view of a part of the detector of FIG. 1.

FIGS. 1 and 4 of the drawings illustrate an X-ray focal plane array detector assembly 10 according to a first embodiment of the present invention. The assembly basically comprises an array of reticulated pixels 26 preferably formed from a selected phosphorescent material of high uniformity, and a visible light pixelated detector 16 coupled to the lower end of the pixel array such that each of the pixels 26 is aligned with a respective pixel of the detector 16. The phosphorescent material of pixels 26 gives off light when exposed to X-rays 24. Kerfs or grooves 15 are located between adjacent pixels 26, and the grooves are completely filled with a glue material 19 which is substantially reflective to visible light.

Since X-ray photoelectric absorption is dependent approximately to the fourth power of atomic number ($Z^4$), the material for forming pixels 26 is of a high atomic number, preferably greater than 30. The thickness of the crystal, or height of the reticulated pixels, is arranged to be sufficient to absorb substantially all the X-rays involved. The material of pixels 26 may be a single high quality crystal, a glass or a plastic with embedded fluorescence centers, as discussed in more detail below.

The upper end of each pixel 26 is coated with a thin film 22 of metal or other light reflecting material. The layer is preferably of a metal of low atomic number, preferably less than 15, so that only minimal X-ray absorption will occur in layer 22. Suitable materials are beryllium and aluminum, for example. The outer surfaces of the pixels 26 on the outermost sides of the array are preferably coated with a thin film 23 of a light reflective metal of high atomic number. Alternatively, all surfaces of the pixels may be coated with a layer of metal prior to filling the grooves with adhesive 19. All sides of the pixels will be coated with a metal of high atomic number while the top surface of the pixels are coated with a low atomic number metal. The detector 16 has an upper layer 18 of insulating material, and is attached to the lower end of the pixel array via a layer 17 of index matching adhesive material.

As illustrated in FIG. 4, the array of pixels 26 is preferably a square, x-y array, and each pixel is of square or rectangular cross-section. However, it will be understood that the pixels may be of other shapes, such as cylindrical, triangular, or the like, as long as each pixel in the array is of identical shape and dimensions to all other pixels for achieving uniform imaging. Mixed shapes and sized of pixels may be used for special purposes, for example to compensate for irregularities in the underlying visible FPA (focal plane array) detector.

In this embodiment, incoming X-rays 24 are converted to light rays 25 which are guided along the pixels 26 into the underlying detector pixels. The height of the pixels 26 is arranged such that substantially all X-rays will be converted into light before reaching the detector 16, which is preferably of a silicon material and susceptible to damage by X-rays. The use of a reflecting medium both between adjacent pixels and at the upper end of each pixel, as well as on all outer or external faces of the array, will reduce or eliminate light loss by scattering from the respective pixels. Each pixel serves as a light guide for channeling the converted visible photons to the active areas of the corresponding visible detector pixel. The pixels are isolated from each other by the light reflective glue material filling the grooves between adjacent pixels, which will substantially eliminate scattering losses and cross talk between pixels. The pixels are fabricated so as to have very smooth walls of excellent optical quality, so that the pixels will be able to serve as highly effective light guides for the converted light. The design of the pixel array has the potential of increasing substantially the light collection efficiency, beyond the approximate doubling collection obtained by introducing the upper reflective layer. This can be very significant in reducing the X-ray dose required for medical radiography, and increasing sensitivity and resolution.

Figure 2:
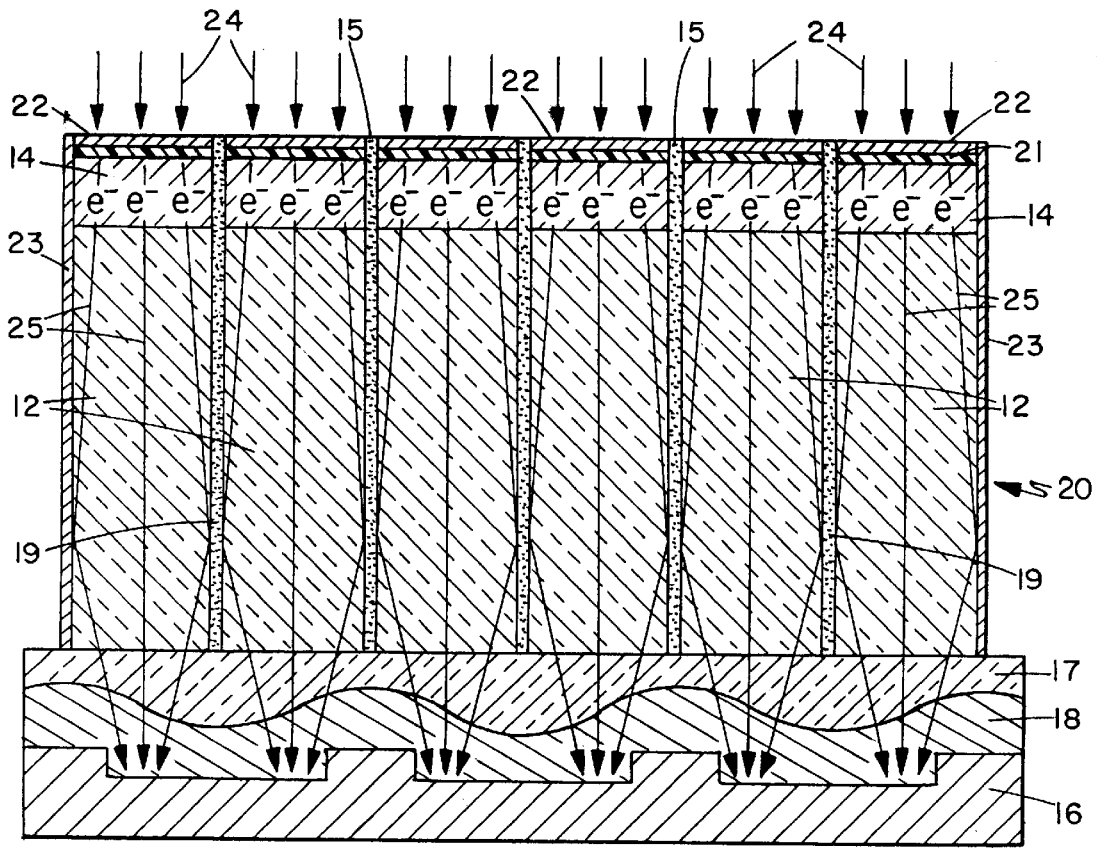
FIG. 2 is a schematic vertical cross-section through an X-ray focal plane array detector according to a second embodiment of the present invention.

FIG. 2 illustrates an X-ray focal plane array detector assembly 20 according to a second embodiment of the invention. In this alternative, instead of reticulating an X-ray phosphorescent material, a good quality optical crystal has a thin layer 14 of high performance scintillation powder bonded to one surface. The assembly is then reticulated to form an array of optical pixels 12 each with a thin layer 14 of high performance scintillation powder bonded to the top of each pixel. A protective or humiseal layer 21 is bonded on top of the phosphor layer 14 prior to reticulation. As in the previous embodiment, the entire assembly is reticulated to form grooves or kerfs which are completely filled with a reflective adhesive material 19, and the upper end of each layered pixel is coated with a thin layer 22 of a light reflecting material, preferably a metal of low atomic number, such as beryllium or aluminum. The outer side surfaces of the outermost pixels in the array are also coated with a thin metal reflective layer 23 of high atomic number. Alternatively, the pixel surfaces may all be coated with a thin metal layer prior to adding the adhesive. The embodiment of FIG. 2 is otherwise identical to that of FIG. 1, and like reference numerals have been used for like parts as appropriate.

In this embodiment, X-rays 24 impinging on the upper end of the detector array will be converted to visible light in the upper phosphor reticulated layer 14. Resultant visible light rays 25 will be channeled through the optical guides 12 into the corresponding pixels of the visible FPA detector 16 attached to the lower end of the array. Pixels 12 are manufactured from high quality single optical crystal of glass or plastic material. The optical crystal is preferably of a high atomic number material so as to block any residual X-rays from reaching the sensitive visible detector 16.

One advantage of the embodiment of FIG. 2 is that the scintillator for the bonded powder layer 14 and the optical guiding glass can each be individually optimized, combining the expertise in the phosphor industry with the well established manufacturing of excellent optical crystals. This detector assembly may therefore be less expensive to manufacture than that of FIG. 1. However, a disadvantage over the previous embodiment is that light scattering in the powder scintillator is unavoidable, and may result in a degradation in resolution.

Although in the illustrated embodiment, light generated in the phosphor layer is guided by means of a reticulated optical crystal into the underlying visible FPA detector, alternative light guiding structures may be used in other embodiments, such as fiber optic faceplates.

Figure 3:
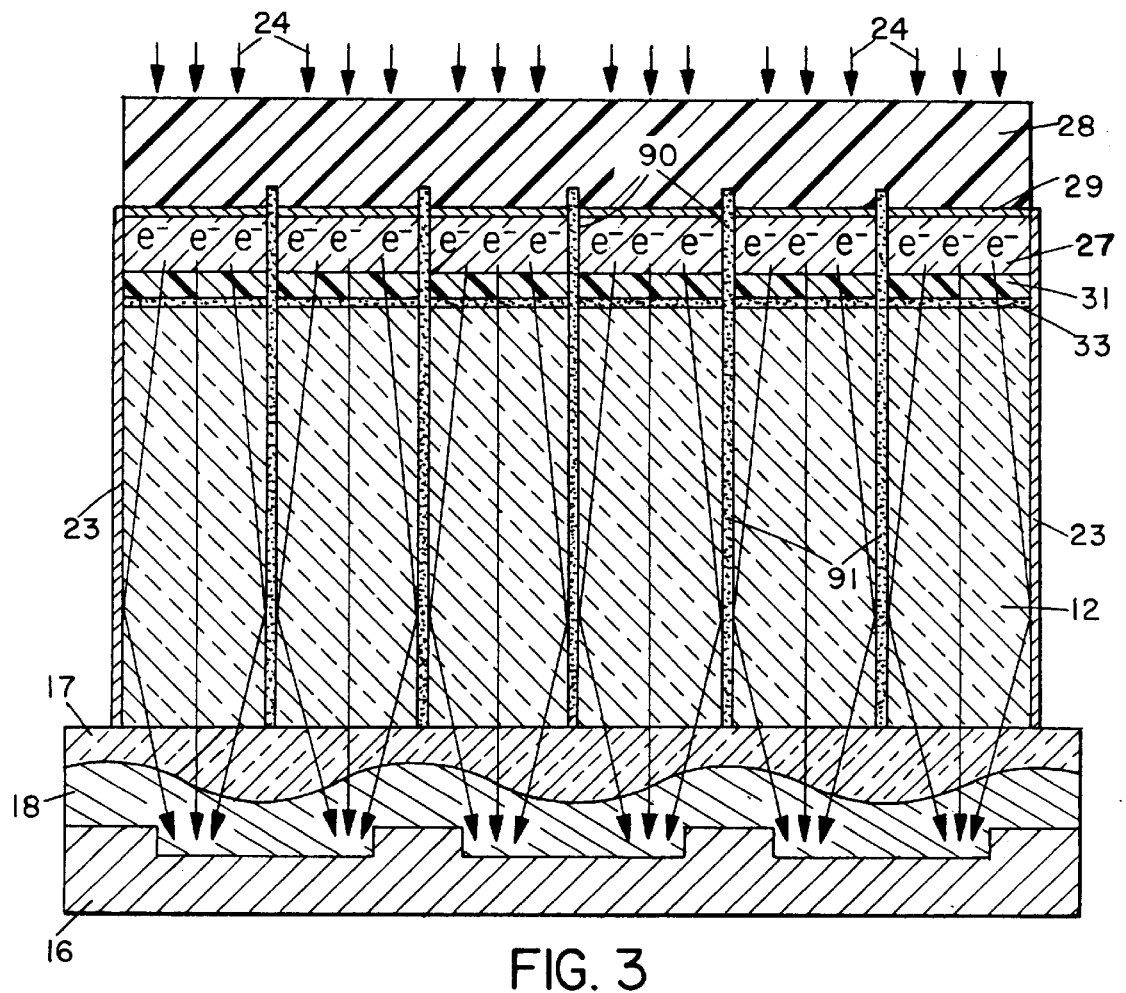
FIG. 3 is a schematic vertical cross-section through an x-ray focal plan array detector according to another embodiment of the invention.

FIG. 3 illustrates a modified detector assembly 30 which is similar to that of FIG. 2 but which is assembled differently. In the embodiment of FIG. 3, as in the previous embodiment, a high quality optical crystal is reticulated to form light guiding pixels 12 which are bonded to an underlying visible FPA detector 16 in the same way as in the previous embodiment, and like reference numerals have been used for like parts as appropriate. However, unlike the embodiment of FIG. 2, where a phosphor layer 14 is bonded to the top of the optical crystal prior to reticulation, the layered phosphor in this embodiment is reticulated separately from the optical crystal, and the two parts are then bonded together via an index matching adhesive layer 33.

A thin layer 27 of phosphor powder is bonded to a metal layer 29, which in turn is bonded to a substrate or supporting layer 28 of a low atomic number material which is transparent to X-rays. The other face of the phosphor layer is coated with a protective humiseal layer 31. The resultant multi-layer assembly is then reticulated to form a grid of pixels separated by grooves or kerfs, and the grooves or kerfs are filled with a light reflective adhesive material 90. The grooves or kerfs may be coated with a thin layer of a low atomic number metal prior to filling with adhesive material 90. Similarly, the reticulated optical crystal has grooves filled with light reflective adhesive material 91. The grooves may also be coated with a thin layer of metal prior to adding the glue, although the metal in this case will be of a high atomic number. The grooves in the multi-layer phosphor assembly extend down into, but not completely through, the substrate or support layer 28. The reticulated optical crystal and reticulated, multi-layer phosphor are then bonded together with the humiseal layer 31 facing downwardly, such that each pixel in the multi-layer phosphor is aligned with a corresponding light guiding pixel 12, as indicated in FIG. 3. The substrate layer 28 used to support the bonded phosphor powder during reticulation thus becomes the uppermost layer of the detector array.

This assembly operates in substantially the same way as the embodiment of FIG. 2. Incoming X-rays 24 pass through the substrate layer 28, which is substantially transparent to X-rays, and are converted to light 25 in the thin phosphor layer 27. The resultant light will then be channeled through the optical guides to the corresponding pixels of visible FPA detector 16. As in the previous embodiment, the optical guides are of high atomic number material so as to block any residual X-rays. The reflective coating on all sides of each of the pixels will reduce or eliminate light escaping out of the pixels and cross talk between adjacent pixels, thus providing improved sensitivity and resolution.

Instead of a thin metal reflective layer bonded on top of the pixels, a high reflection, multi-layer dielectric coating of low atomic number material may alternatively be used. Metal layers may also be deposited on the sides of the pixels prior to introduction of the glue or adhesive into the kerfs or grooves, for enhanced reflection, as noted above. The metal layers on the sides of the pixels will be of high atomic number in the embodiment of FIG. 1. In the embodiment of FIG. 3, the side metal layers will be of low atomic number in the reticulated phosphor, and of high atomic number in the reticulated optical crystal or glass.

The selection of the phosphorescent or scintillation material for the rectangular pixel array is critical. The pixel array is fabricated by a laser micro-milling process, described in more detail below in connection with FIGS. 8 and 9, and it is therefore important that the selected material is compatible with a laser micro-milling process. The pixels may be fabricated either from a bulk single crystal or piece of a uniformly phosphorescent material or from a layer material. The following criteria are the preferred rules for selection used in selection of the x-ray phosphorescent material for the pixel array:

1. High x-ray capturing cross-section at the specified energies.
2. High fluorescence conversion efficiency.
3. Visible fluorescence in the spectral range of the highest silicon FPA sensitivity.
4. Fast fluorescence rise and decay time.
5. High optical transparency to the fluorescence light.
6. Absence of long term light persistence or trapping (>1 ms).
7. Well behaved conversion response function, preferred linear.
8. Macroscopic and microscopic high uniformity and high performance integrity.
9. Mechanical robustness.
10. No scattering centers in the bulk or on either surface.
11. Both parallel surfaces optically polished.
12. Stability to temperature and other medical environmental conditions.
13. Thermally matched with the silicon FPA detector (similar expansion coefficients).
14. Commercial availability at low-cost.
15. Compatibility with the laser micro-milling process.

The materials were selected both by research and by experimental evaluation of materials which appeared to have the potential of meeting the criteria listed above. Once suitable candidates had been located, the candidates were tested for compatibility with the laser micro-milling method or process of this invention.

In the embodiment of FIG. 1, the material of pixels 26 may be an intrinsic scintillator or an extrinsic scintillator. There are therefore three possible alternative types of scintillator material, two of which (intrinsic and extrinsic scintillators) are uniform materials used in the embodiment of FIG. 1, and one of which is used in a bonded powder state in the layered configuration of FIG. 2 or FIG. 3. A disadvantage of the embodiment of FIG. 1 using a single, micro-milled scintillator crystal is its availability and price. However, it has advantages over the layered arrangement of FIGS. 2 and 3, since it reduces scattering and may permit total x-ray absorption over the long pixel, without jeopardizing resolution.

The following two examples were found to be particularly suitable and also met those criteria listed above. In the following examples, Example 1 is for a scintillator layer as in FIG. 2 or FIG. 3, and Example 2 an intrinsic scintillator for the embodiment of FIG. 1.

EXAMPLE 1

In this example, a layer of $Gd_2O_2S:Tb$: (4 $\mu$m particle size) with a 7.5 $mg/cm^2$ coating weight was coated on a 1 mm thick x-ray absorbing glass. The resultant coated glass was then micro-machined to produce an array of pixels or light guides each having a coating layer of x-ray phosphorescent material at the upper end, as in the embodiment of FIG. 1. The fluorescence emission wavelength spectrum peaks at 545 nm and the decay time is approximately 1 mS. The substrate glass density is 4.8 $g/cm^3$, and it has a Young's modulus of $62.7 \times 10^2$ $N/m^2$, and a temperature expansion coefficient of $81.8 \times 10^{-7}/C$. The transmission of the fluorescence light at 545 nm through the substrate is above 92%.

EXAMPLE 2

In this example, a single crystal of bismuth germanate ($Bi_4Ge_3O_{12}$) was used to form an array of phosphorescent crystals in the embodiment of FIG. 2. This material is a high atomic number cubic (Eulytine) crystal of high density, 7.13 $g/cm^3$. The crystal is an excellent phosphor for X-rays with a slightly lower fluorescence light output than $CdWO_4$, and it emits at around 480 nm. The index of refraction is 2.15, it has a very fast decay time of around 300 nS, and a relatively low afterglow (7 mS). Its thermal coefficient is $7 \times 10^{-6}/C$. However, it has quite a large temperature dependence response in the temperature range of 0° to 60° C. This crystal is relatively hard (Young's modulus=$10.56 \times 10^{10}$ $N/m^2$) and is not hygroscopic. It also does not have any crystalline cleavages.

Both of the above materials fulfill a great part of the desired criteria listed above, and are currently commercially available. Other suitable candidates which exhibit high efficiency x-ray fluorescence along with most of the other criteria listed above, are $CdWO_4$ (cadmium tungstate), $Y_3Al_3O_{12}:Eu^{+3}$ (yttrium aluminum garnet doped with europium), YAG:Ce, CsI(Tl), CsI(Na), CsI, NaI, CsF, CaF (Eu), LiI(Eu), and $Gd_2SiO_5$:Ce. Other potential candidates are $LuTaO_4$:Tb and $LuTaO_4$:Nb, which may be bonded to an optical crystal or glass substrate, and single crystals of $Y_2O_3$, which are very robust. Other examples for the layered detector of FIGS. 2 and 3 are $Gd_2O_2S$:Pr,Ce,F, ZnCdS:Ag, and $Y_2O_2S$:Eu.

Of the foregoing examples, it has been determined that bismuth germanate is particularly advantageous for an XFPA detector. Theoretical calculations indicate that an XFPA digital imaging system using a reticulated bismuth germanate ($Bi_4Ge_3O_{12}$) phosphor for conversion of x-rays into light rays may exceed the imaging performance of a corresponding current XFPA imaging system by almost an order of magnitude.

The dimensions of the XFPA detector apparatus 10,20,30 and particularly the array of pixels in each of the above embodiments, is also critical for achieving the desired performance. It is desirable for the kerfs or grooves to be as narrow as possible, in order to minimize the dead area of the detector. The groove should be as narrow and as deep as possible without damaging the adjacent pixel structure. The micro-milling method described below allows the grooves between pixels to be made relatively narrow, and the groove or kerf width is preferably in the range from 4 $\mu$m to 15 $\mu$m. The cross-sectional dimensions of each pixel are preferably in the range from 25 $\mu$m×25 $\mu$m to 250 $\mu$m×250 $\mu$m, and the height of the pixel is preferably of the order of 1 mm. The cross-sectional dimensions of the entire array are determined by the dimensions of the available high quality visible light pixelated detector. One suitable detector which is currently available is a CCD detector, available in sizes of the order of 1"×1", with 1000×1000 pixels where the pixels are 25 $\mu$m×25 $\mu$m. The scintillator thickness is preferably sufficient to completely stop the penetration of any X-rays of the energy and dosage typically used in medical or other radiography applications. The selected dimensions of the groove produce an aspect ratio (kerf height divided by kerf width) preferably in the range of 5:1 to 150:1. Additionally, the laser processing provides pixel walls which are optically finished or polished to a smoothness sufficient to substantially reduce or prevent scattering.

The selection of the glue or material 19, 90, 91 filling the groove or kerf in each of the above embodiments is also critical to optimum performance of the detector. The material must be reflective to light, so that the surfaces of the adhesive material bordering the laser polished surfaces of the pixels act as reflective surfaces to reflect all light rays back into the respective pixels, increasing pixel collection efficiency. Additionally, the material should be non-transmissive, so as to provide optical isolation to prevent cross-talk between neighboring pixels. Preferably, a concentration of high atomic number components is included in the glue, so as to prevent x-rays from leaking into the underlying radiation sensitive silicon visible detectors and their readout circuitry. Suitable such components are platinum, lead, or other materials with an atomic number greater than 30. The scintillator thickness is preferably of the order of 1 mm, and, together with the introduction of x-ray absorbing components in the glue between adjacent scintillator crystals, will significantly reduce the potential for radiation damage to the underlying visible detector or active silicon devices. This will significantly improve the reliability and operation longevity of the electronic imaging XFPA detector over those previously available in the field.

The adhesive filler material selected preferably has the following properties:
1. Low viscosity and high wetting.
2. Relatively high melting temperature.
3. Chemical compatibility with other components.
4. Atmospheric chemically inactive.

5. Curing time less than 1 hour, without high temperature annealing.
6. High adhesion and high Young's modulus.
7. Smooth and shiny final surfaces for high optical reflectivity, and no shrinkage during or after curing.
8. Light absorption to prevent any light penetration.
9. Material which absorbs x-rays of the desired energy and dosage.
10. No secondary luminescence under x-ray or other radiation.
11. Thermally matched with the other materials.

Based on the foregoing criteria, adhesives which are suitable for use as the adhesive filler 19 in the grooves or kerfs 15 are Epoxy 301 and Epoxy 509F. Preferably the epoxy is mixed with high purity tungsten, platinum, or other commercially available fine metal powder of high atomic number, with particulate size of the metal particles preferably being less than 2 $\mu$m. It is critical that the metal particles have a size much less than the kerf width.

Neither of the above two adhesives is affected by moisture, and both are highly resistant to the environment's chemical and physical changes. They also demonstrate low viscosity, low exotherm, and good handling characteristics. Any suitable commercially available index matching glue material is selected for the index matching glue layer 16.

In the embodiment of FIGS. 2 and 3, selection of a good quality optical crystal glass or plastic for the light guiding pixels 12 is also important. The criteria for selection of the crystal material are:
1. Good optical quality material, preferably a single crystal or glass or plastic.
2. Macroscopic and microscopic high optical uniformity.
3. Maximum optical transparency to the fluorescence induced in layer 14 or 27.
4. Absence of any fluorescent centers.
5. Absorbing substantially all X-rays of energies and doses used.
6. Preferably high atomic number material (Z>30).
7. No optical scattering centers in bulk or surfaces.
8. Ability to obtain good polishing surfaces.
9. Stability to temperature and other environmental conditions.
10. Thermal match with visible detector and phosphor layer (similar thermal expansion coefficients).
11. Commercially available at low prices.
12. Compatibility with the laser micro-milling process.
13. Mechanically robust.

Some suitable materials which fall within the above criteria are glasses made of high atomic number materials, and single crystals of $KNbO_3$ (potassium niobate) or $PbZrO_3$ (lead zirconate).

An x-ray or radiographic imaging system, for medical or other purposes, such as non-destructive testing, utilizing the XFPA detector described above will now be described in more detail with reference to FIGS. 5 to 7. Although a medical application is described below, it will be understood that the imaging system may alternatively be used for examining and testing in other fields. As mentioned above, a single XFPA pixelized detector as described above will typically be limited by the currently available detectors for the fluorescence induced light. If a CCD detector is used, the low cost detector matrix currently available has a size of the order of 1 inch by 1 inch. Thus, for visualizing larger objects, a number of XFPA detectors may be butted side by side to cover the area of interest. However, this results in a rather bulky detector for target objects of up to 20" by 20" in size, such as bones and body organs.

Figure 5:
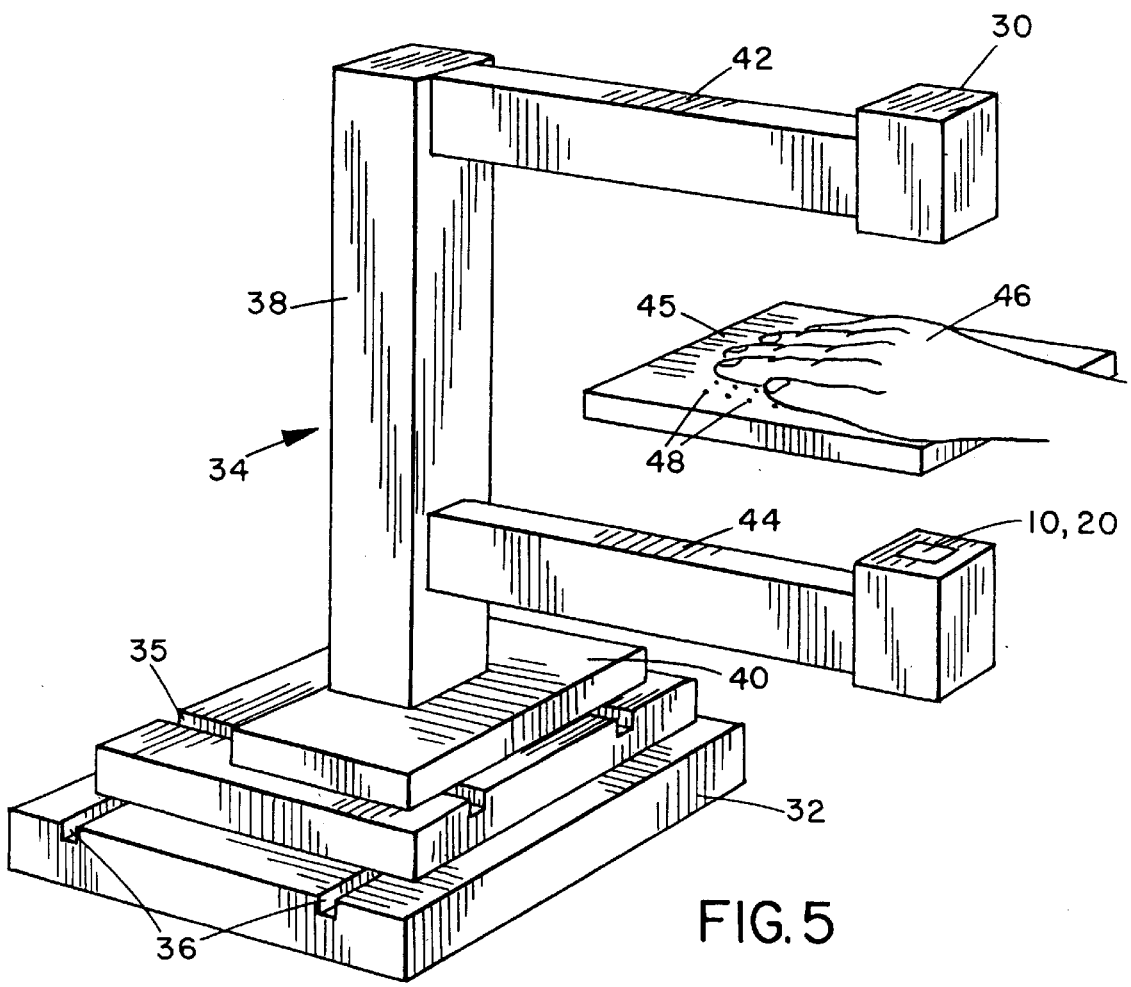
FIG. 5 is a perspective schematic view of a radiographic imaging system using the detector of FIGS. 1, 2 or 3.
Figure 6:
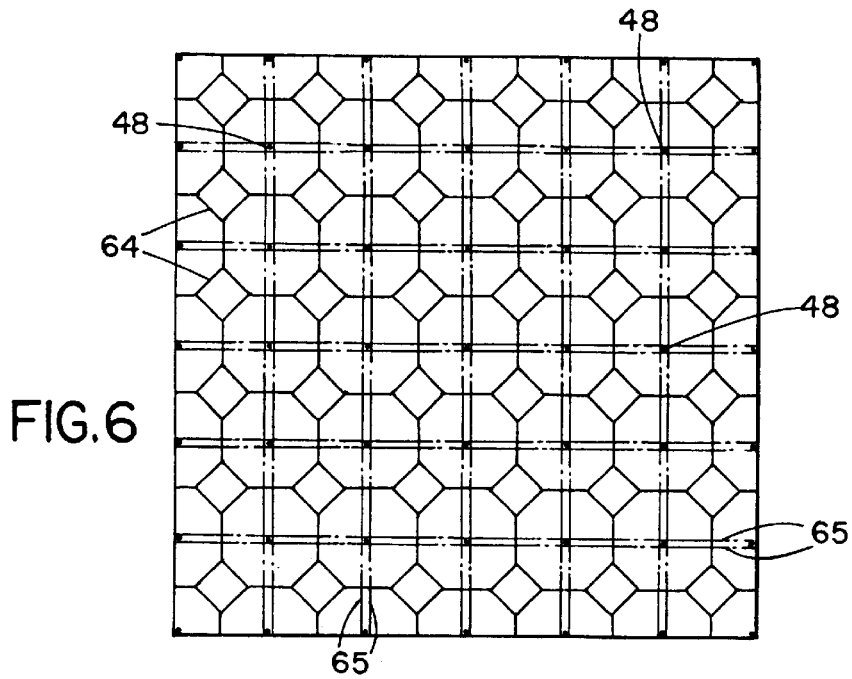
FIG. 6 is a schematic illustration of an exemplary picture formed by the system of FIG. 5.
Figure 7:
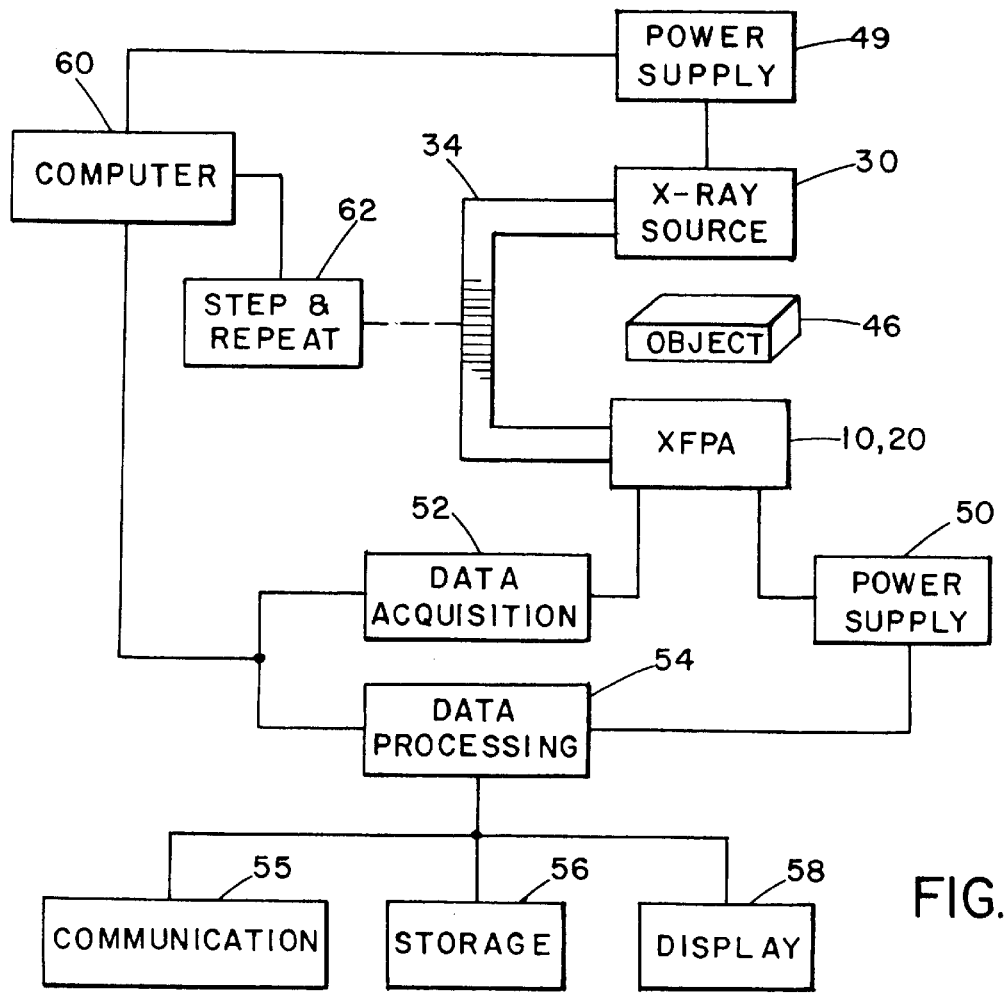
FIG. 7 is a block diagram of the system of FIG. 5.

Therefore, FIGS. 5 to 7 illustrate a preferred embodiment of a portable XFPA electronic imaging system utilizing the XFPA detector described above, in which a series of images are taken in a "step and repeat" manner using one or a butted group of detectors, to eventually produce a complete image of the area to be scanned.

As illustrated schematically in FIG. 4, a stand for supporting an XFPA detector 10 opposite an x-ray source 30 has a base 32 and a support frame 34 adjustably mounted on the base for movement in perpendicular x and y directions via suitable drives 35,36, respectively, The support frame 34 has a vertical bar 38 projecting upwardly from base plate 40 which is movably mounted on base 32. A pair of parallel, spaced arms 42,44 project outwardly from vertical bar 38 in a horizontal direction, forming a generally F-shaped structure. Although the stand is F-shaped in the illustrated embodiment, it will be understood that other shapes may be used, such as a square or circular support, as long as the aligned x-ray source and XFPA detector are located and maintained in alignment opposite one another and can preferably be moved together in a "step and repeat" motion or other pattern to cover the object.

Although the x-ray source and XFPA detector in the illustrated embodiment are mounted opposite one another and in alignment in a rigid, common stand, they may alternatively be mounted separately and controlled by computer to move in the desired alignment.

In the illustrated embodiment, the x-ray source 30 is mounted adjacent the end of the uppermost arm 42 so as to direct an x-ray beam vertically downwardly. The XFPA detector 10, 20 is mounted adjacent the end of the lower arm 44 so as to face upwardly towards, and in alignment with, the x-ray source 30.

An x-ray transparent support table 45 for an object 46 to be x-rayed, such as a hand as illustrated in FIG. 5 by way of example, is positioned between the arms 42 and 44. A series of small fiducials or spots 48 of x-ray opaque material or ink are provided on the support table at spaced intervals in the x and y directions so as to produce a generally rectangular array of spaced spots. Each set of four spots defines a square or rectangular array of dimensions slightly less than the field of view of the XFPA detector 10 or 12. In other words, where the detector 10 has dimensions of 1" by 1", the spacing between adjacent fiducials will be slightly less than 1".

The control system for the imaging system is illustrated schematically in FIG. 7. The x-ray source 30 and XFPA detector 10,20 are each connected to a power supply 49,50, respectively. The output of the XFPA detector is connected to a data acquisition block 52, which is linked in turn to a data processing unit 54. The output of the data processing unit 54 is linked to a communication device 55, a storage unit 56, and a display unit 58 for real time display of the image of object 56. A computer 60 is linked to the x-y table 32 to operate a step and repeat control 62. The motion system will step the support frame carrying the aligned x-ray source and detector preferably in a serpentine path while the object is held stationary on table 45, so as to raster an object area of 20" by 20", taking an image of the x-rays received by the aligned detector at every step position. It will be understood that alternative movement patterns, other than serpentine, may be used if desired to cover the object area. Preferably, the motion is stopped for at least 100 mS while each image is taken. Computer 60 controls motion of the system, as well as the x-ray source shutter, the imaging sequence, the data acquisition, the communication and display subsystems.

The computer is also programmed to process and interface the data to produce a final combined or mosaic radiographic image from the sequence of successive images 64, as generally illustrated in FIG. 6. The interlacing of the images 64 is made possible by the location of the images of fiducial spots 48 on each image. These locations are matched by pattern recognition and data processing. This processing will recognize the fiducial patterns and mathematically overlap their precise, spatial locations as best illustrated in FIG. 6, which illustrates a mosaic pattern by way of example only. The double lines 65 indicate the overlap between adjacent images in both the x and y direction. Once the final image has been successfully combined, the fiducial marks will be removed from the image to produce a clear picture, and the average data in adjacent pixels will be introduced to provide image completion of the patterns inside. Although fiducials are used to create the image in this embodiment, it will be understood that fiducials may not be required where the exact position of the source and detector is known, and movement is precisely controlled.

The x-y motion table or base 32 must provide high precision movement which can easily maintain the required spatial accuracy and alignment precision along x and y axes. Some suitable motion systems which provide this degree of precision in an x-y motion table are linear servo motors, ball screws with servo motion, and ball screws with stepping motors. The support stand for the x-ray source and detector must be sufficiently stiff to resist vibration, and must be a robust, light weight and high damping material. A polymer composite material is preferred for the stand, since this has greater stiffness and dimensional stability than steel, cast iron, or aluminum.

The selection of the x-ray source 30 is also critical in producing a high resolution image. A large area radiating x-ray source will result in wide shadow imaging of a narrow object, thus causing blurring of the image. Thus, a small size x-ray source such as an x-ray microfocus source is preferably used. Such sources are commercially available in the 10 KeV to 100 KeV x-ray range, and can be considered as point sources. Alternatively, a well collimated x-ray beam may be used.

The laser micro-milling method used for reticulating the phosphor samples according to a preferred embodiment of the invention will now be described in more detail with reference to FIGS. 8 and 9. The same method may be used for reticulating a single phosphor crystal as in FIG. 1, or an optical crystal with a phosphor layer on top as in FIG. 2, or for separate reticulation of a layered phosphor and an optical crystal as in FIG. 3, in each case with or without an upper metal layer. The method requires precise control in order to achieve the desired high aspect ratio and narrow kerf grooves without causing any damage to the pixels themselves. This is because the materials which are most suitable for forming the phosphorescent pixels are also materials which are particularly difficult to laser machine properly due to their relatively low melting points or are chemically unstable at higher temperatures. Other materials cannot tolerate wide temperature differentials, and will crack under such conditions. Thus, the laser cannot be held at one spot on the crystal for any length of time, or the material will decompose. It is extremely important with such materials that the laser beam irradiance, or energy/unit time/unit area, be kept substantially constant during the entire abrasion process, and be such that the material does not melt into the pixel structure, decompose, or crack.

Figure 8A:
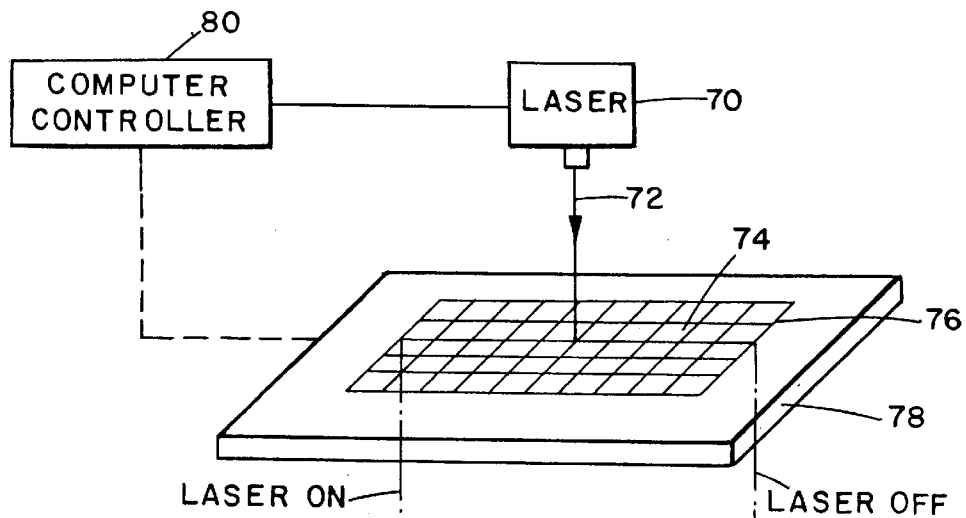
FIG. 8A is a schematic illustration of a method of making a reticulated phosphor detector by laser micro-milling, and illustrates the spatial and temporal control of the laser.

There are a number of different parameters which must be controlled in order to keep the irradiance at the desired constant level. In the method as illustrated in FIG. 8A, a laser 70 directs a laser beam 72 at an underlying crystal or substrate 74 held in a stage or sample holder 76 on a movable table 78 which can be moved in perpendicular x and y directions and also rotated in a θ direction by x-y and θ drive. The sample holder is designed in a conventional manner so as to lock the sample in a precise position and alignment during laser processing. The table may be any suitable x-y table, such as the Anoride Table produced by Anorad Corporation of New York. This moving table has a built in x-y-θ drive as well as a velocity feedback control to ensure a substantially constant velocity. Movement of the table is controlled by computer 80 according to selected program instructions. Additionally, the laser has an adjustable focus to provide a z-direction adjustment relative to the table, also under the control of computer 80.

Figure 8B:
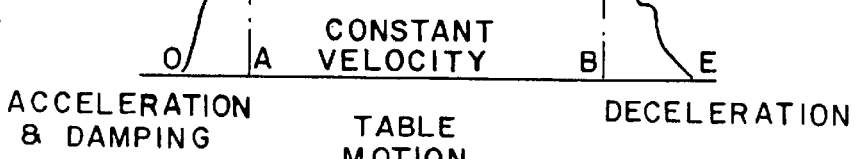
FIG. 8B illustrates a series of grooves formed by the method of FIG. 8A.
Figure 8C:
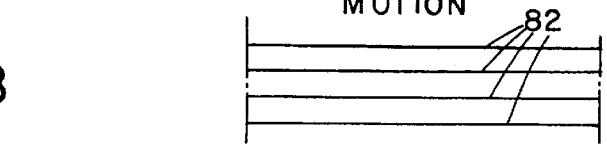
FIG. 8C illustrates one possible technique for milling a groove.

In the illustrated embodiment, the laser beam is held stationary in the x-y direction during the micro-milling process, while the table is moved back and forth in a generally linear path, let us say in the x direction, as illustrated in FIG. 8C. Then the table is moved to the next line, and so on, so that the laser beam mills a plurality of parallel grooves 82 in the top of the crystal, as illustrated in FIG. 8B. The table is then moved in the other direction (say in the y direction) so that a set of parallel grooves perpendicular to grooves 82 can be milled in a similar manner, forming a reticulated x-y grid pattern. The program controlling both the laser actuation and movement of the table is designed such that the laser is not turned on until the moving table has reached a constant velocity, at the desired location, as illustrated in FIGS. 8A and 8B, which demonstrates the on-off sequencing of the laser.

As best illustrated in FIGS. 8A and 8C, the computer starts a scan at point O, about 50 μm prior to the start of the micro-milling at point A. Thus, the laser is off as the table accelerates up to constant velocity. From A to B, the table velocity is constant and the laser is on. At point B, the laser is turned off, while the table moves on from this point, starting to decelerate after point B to point E. At point E, the direction of movement is reversed. The table then accelerates back in the opposite direction and the laser is turned on again at point B, when the velocity is again constant and stopped at point A, after which the table decelerates to point O. The same line is then repeated along the surface of the crystal.

Figures 9A, 9B, 9C, 9D:
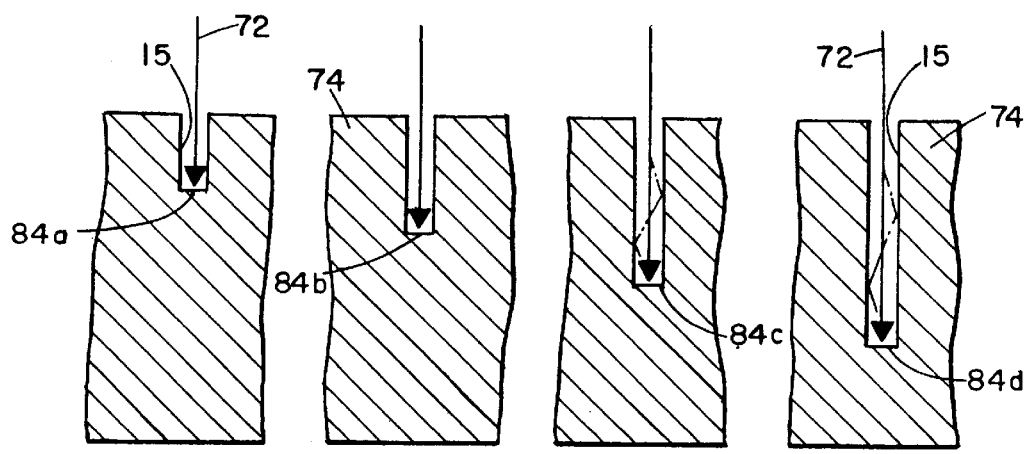
FIGS. 9A to 9D are schematic illustrations of a series of steps in the laser micro-milling method.

The laser intensity and velocity of travel is such that only a small portion of each groove is milled during each pass of the laser along the groove, as best illustrated in FIGS. 9A to D. After several passes of the laser along a particular groove 15, the groove will be ablated to a bottom end 84a. FIG. 9B shows a successive stage where the groove has been ablated to a depth 84b. As illustrated in FIGS. 9C and 9D, as the groove deepens, it will act as a wave guide for the laser beam, concentrating the beam at the current lower end of the groove 84c,84d, respectively. Typically, the ablation rate is only about 2 to 10 microns for each pass of the laser beam along the groove, and between 20 to 120 passes of the laser are typically preferred in order to fully ablate each groove.

The milling of the reticulated array may be accomplished in a number of alternative ways. For example, each groove 15 may be fully ablated to the desired depth before the table moves on to align the laser with the next groove in the array. Alternatively, each groove may be milled to a certain percentage of the desired depth, say 20%, before the table moves on to align the laser beam with the next groove. After all grooves have been milled to 20%, say, of the desired depth, the procedure is repeated until all grooves are milled to the desired depth. In these two alternatives, the table will move back and forth with the laser beam traveling back and forth repeatedly along the same groove, as generally indicated in FIG. 8C, before moving on to the next groove. In another alternative, the laser beam may make one pass along all grooves in the x-y direction, and then repeat the same sequence for a second pass, and so on, until all grooves are milled to the desired depth in the same pass of the laser. The second of the above alternatives is preferred. In each case, the table will travel at a constant velocity from point A to point B or back from point B to point A, preferably to within±2%, due to the feedback velocity control built into the x-y table.

Figure 8D:
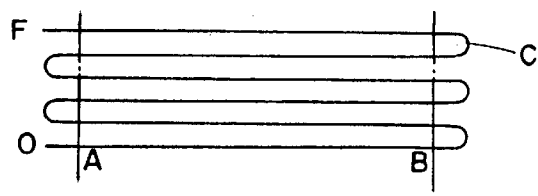
FIG. 8D illustrates the path of the sample relative to the laser beam during milling of a series of spaced, parallel grooves according to another technique.

FIG. 8D illustrates another alternative where the table moves continuously in a serpentine path, rather than slowing down and reversing direction after every pass along a groove, as in FIG. 8C. The movement starts at point O, then traverses the serpentine path from point O to point F, with the laser activated at the start and turned off at the end of each groove, i.e., the laser is on from point A to point B in the first pass, from point B to point A in the second pass, and so on to the end of the serpentine path.

During the laser micro-milling process, the focus of the laser is adjusted periodically by a certain amount (z-direction adjustment) to optimize the coupling of the light into the groove. Typically, the focus is changed by about 3 microns after about 20 passes of the laser. The procedure is repeated so that the laser beam travels along each of the grooves numerous times, until each groove is machined to the desired depth. The laser fabricated walls will be smooth and will act as light guides for further processing of each groove, concentrating the light on the end of the groove which is currently being ablated. Each groove is preferably milled to a depth so as to almost penetrate the crystal, but terminates just short of the bottom face of the crystal.

In addition to controlling the direction and velocity of the table, and the focus of the laser beam, and actuating the laser only when the table has reached a constant velocity, the laser parameters are also strictly controlled by the computer to ensure uniform processing and reduce the risk of damage to the individual pixels. The laser is preferably a computer controlled Nd:YAG single mode CW laser which is Q-switched to provide continuous pulses of less than 100 nS in width. The Nd:YAG laser can be operated in the infrared 1.06 $\mu$m fundamental spectral line, the second harmonic line at 0.53 $\mu$m, the third harmonic line at 0.35 $\mu$m, or the fourth harmonic line at 0.26 $\mu$m. The laser is preferably optimized to obtain a pure $TEM_{00}$ symmetrical mode at the sample site. This mode of operation will result in the smallest focusing beam spot size at the target. The frequency of the acoustic switch is preferably in the range from 0.5 to 30 kHz, and the intensity is preferably in the range from 0.1 mW to 5 W. The laser is also controlled so that the first, larger pulse after the laser is first switched on is "killed", by providing a first pulse killer in the laser control circuitry or by an external light switch. Such circuitry is conventional in Q-switched lasers. The subsequent laser pulses will preferably be of substantially equal amplitude and width to around±2%.

The laser intensity and the velocity of the table, as well as the focus of the laser beam, are all controlled so as to provide a substantially constant flux per unit area, or energy per unit time per unit area, along the groove. The flux per unit area is selected based on melting or decomposition point and opacity of the crystal to be milled, such that only the material in the groove itself is ablated and the energy applied is such that the walls of the groove will not be damaged. The irradiance or flux per unit area at the processing location may be in the range of 1 to $10^5$ Watts/cm$^2$, depending on the characteristics of the substrate material. For micro-milling of $Bi_4Ge_3O_{12}$, it was found that an irradiance of 40 Watts/cm$^2$ produced optimum results. The optimum flux per unit area, to ensure that just the groove area is ablated and the surrounding pixel structure is not damaged, may be determined experimentally for each desired phosphor material. The material is exposed to a low intensity laser beam, and the intensity is gradually increased until the material just starts to ablate in the beam area, without spreading into adjacent regions. This is then used as the laser intensity parameter for that material. For example, in the multilayered configuration, where there is an upper metal layer, a higher flux per unit area is preferably used for the first pass of the laser, in order to cut through the metal, and the flux is then preferably lowered to the predetermined level for the underlying phosphor material. The table velocity is preferably in the range from 0.5 to 0.001 inch/sec.

It has been found that, by strictly controlling the laser parameters and the constant velocity of the movement of the crystal relative to the laser beam, excellent reticulation of a phosphor crystal as in FIG. 1, or a layered phosphor as in FIGS. 2 and 3, can be achieved. This process produces high aspect ratio reticulation in phosphor materials with a groove width of less than 6 $\mu$m between adjacent pixels. The laser fabricated pixel walls have been demonstrated to be very smooth and of high optical quality, as a direct result of the strict control of the laser and motion parameters. Due to the smoothness of the laser fabricated walls and their optical quality, the partial micro-milled groove will itself serve as a light guide for further laser processing, allowing transfer of self-trapped laser energy to the bottom of the groove for further micro-milling. This permits grooves of a very high aspect ratio, up to 120:1, and narrow width, of less than 6 $\mu$m, to be laser machined in materials which are conventionally considered to be difficult to machine with a laser.

The laser micro-milling process described above may be used to reticulate a single piece of phosphor material, either in the form of a phosphor crystal or a glass or plastic doped with scintillator elements. The phosphor material may be reticulated alone or with a thin metal film or layer deposited on its upper surface, as in FIG. 1. The metal layer may alternatively be applied after reticulation. The process may also be used to reticulate an array as in FIG. 2, where a layer of phosphorescent material in the form of a bonded powder is coated on top of an x-ray absorbing glass substrate, either with or without a metal layer on top. In either case, excellent results were achieved by strict process control as described above.

The method of forming the thin reticulated phosphor layer on top of the reticulated optical glass in the embodiment of FIG. 3 is preferably in two stages. Firstly, a granular phosphor layer bonded with epoxy or the like is deposited on a supporting substrate 28, preferably with an intervening thin layer 29 of metal. A humiseal layer 31 is preferably deposited on top of the phosphor layer for protection of the phosphor layer. The layered phosphor is then reticulated in the manner described above, with the grooves extending through the entire thickness of the phosphor and partially into the substrate. The humiseal protective layer 31 may be of any suitable protecting polymer or epoxy material which is compatible with the laser micro-milling process and the fluorescence effects. This layer adds strength to the granular phosphor layer, and avoids loss of particulates as a result of laser micro-milling, ensuring that the milled pixels retain structural integrity.

A suitable optical crystal of equivalent dimensions is then reticulated or laser micro-milled separately to produce a pixel array of identical shape and dimensions to the phosphor structure. After filling the grooves in both the layered phosphor and the optical crystal with a reflective adhesive material, the reticulated phosphor structure is bonded to the reticulated optical crystal with the pixels in alignment. The advantage of micro-milling these components separately is that the laser can be optimized to the particular material being milled in each case, ensuring the formation of uniform, smooth sided pixels through the entire structure.

The thin, coated phosphor layer may alternatively be bonded to another type of light guiding structure, instead of the reticulated optical crystal, such as a fiber optic faceplate, provided that the light channel diameters are smaller than the reticulation, to maintain the resolution required.

After formation of the pixels, either in a single, thick phosphor or in the separately reticulated thin phosphor and optical crystal layered structure, the structure is cleaned to remove laser debris. Preferably, the pixel array is cleaned by means of a conventional ultrasonic cleaning process. The power and pulse shape of the ultrasonic cleaning head is adjusted to produce effective cleaning of the laser debris without damage to the reticulated structure.

Although the pixels are preferably of square cross-section in the embodiments described above, it will be understood that they may be of other alternative shapes, as required by the detector array architecture. Thus, pixels of rectangular, triangular, cylindrical, or other shapes may be micro-milled in an equivalent manner, by suitable control of the x-y table drive.

After formation and cleaning of the reticulated pixel structure, the structure is preferably checked using an optical high magnification microscope and a scanning electron microscope to ensure that the crystals demonstrate no collateral damage as a result of either the laser micro-milling or the cleaning process. The selected adhesive is preferably introduced into the grooves according to the following technique. It is important that the grooves are completely filled by the adhesive material. This is preferably achieved by introducing the adhesive along one side of the crystal into the grooves under microscope observation, and allowing the adhesive to fill all of the grooves by capillary action. The adhesive is then cured for the required time period.

When the reticulated thick or thin multi-layered structure is fully cured, it is attached to the visible detector preferably via a suitable index matching glue layer 16, maintaining the respective phosphor pixels in alignment with the corresponding visible silicon pixels.

Any suitable high-performance, visible FPA imaging detector may be used for the visible FPA detector attached to the reticulated phosphor structure. The detector is preferably silicon based. Some suitable silicon FPA detectors that can be matched 1:1 with the reticulated phosphor described above which are commercially available are the Thomson-CSF 1024×1024, the SITE 2048×2048, and the KODAK KAF-1000 with 1024×1024 photosensitive crystals. For example, the KODAK KAF-1000 has a pixel size of about 24.6×24.6. If this is provided in a 1" by 1" size, and the pixelated phosphor structure has similar dimensions with 25×25 micron pixels, a matrix of $10^6$ pixels is produced with a 1:1 match between the phosphor pixels and the silicon pixels, resulting in a resolution theoretically approaching 20 lp/mm.

Due to the excellent surface quality of the laser micro-milled pixel walls, the phosphor pixels serve as light-guides for the induced fluorescent light. The reticulation and reflective glue will prevent most of the cross-talk between pixels so that, with a 1:1 match to the underlying silicon visible detector, the resolution of the sandwiched detector will be theoretically comparable to that of the underlying silicon visible detector.

The thickness of the phosphor converter array is preferably designed such that almost no leakage of x-rays through the array and into the underlying electronic circuitry can occur for radiation at the energy and doses typically used in medical or non-medical radiography applications. Experimental testing has shown that, for the embodiment of FIG. 1, a crystal of 1 mm. thickness showed no transmission for x-rays at 40 KeV. For higher energy x-rays, in the 70 KeV level, only $CdWO_4$ and $Bi_4Ge_3O_{12}$ crystals can be used to provide sufficient protection to the underlying silicon detectors and electronics.

The x-ray focal plane imaging detector of this invention, fabricated by an innovative laser micro-milling method as described above, has the capability of providing real-time, high performance radiographic imaging at relatively low cost. This will allow a small, portable X-ray imaging system to be carried by emergency personnel for field use, for example at accident scenes or on battlefields, permitting enhanced, immediate diagnostic evaluation. Such a system is also advantageous in the dental field, in order to permit real-time evaluations and adjustments, in addition to cost savings and reduced radiation exposure. The "step and repeat" method for taking a series of successive pictures scanned across an entire image will result in a lower x-ray total accumulated exposure than with current exposure for x-ray film.

The controlled laser micro-milling method described above has the capability of milling high aspect ratio, narrow kerfs or grooves in highly x-ray sensitive, short life phosphor crystals which were previously considered unsuitable for accurate laser processing. Because of the strict control of the energy per unit area per unit time input along each groove in the crystal, it can be ensured that only the minimum amount of energy required to ablate the desired region is put into the crystal, reducing the risk of degradation of the groove walls defining the pixel array. This control is achieved by the constant relative velocity motion of the sample being machined relative to the laser beam, and by control of the laser intensity and pulse width. Since the energy per unit area per unit time is kept relatively adequate, numerous successive passes of the laser along the groove are required in order to micro-machine the entire groove to the desired depth. The highly controlled laser processing results in fabrication of highly smooth pixel walls of high optical quality. Thus, the fabricated pixels serve as light guides for the x-ray induced light, with little or no cross talk between adjacent pixels or escape of light out of each pixel due to the smooth optical finish of the side walls and the reflective and adhesive material filling the grooves.

Although some preferred embodiments of the present invention have been described above by way of example only, it will be understood by those skilled in the field that modifications may be made to the disclosed embodiments without departing from the scope of the present invention, which is defined by the appended claims.

I claim:

1. A detector for X-ray focal plane imaging, comprising;
    an X-ray fluorescent substrate having a first surface and a second surface, the first surface having grooves defining an array of elongated, micro-milled light-guiding phosphor pixels each pixel being of substantially uniform cross-sectional dimensions along its entire length;
    a light reflective, adhesive material substantially filling the grooves between adjacent pixels; and
    an array of visible light detecting pixels coupled to said second surface of said substrate for receiving light emanating from said substrate pixels.

2. The detector as claimed in claim 1, wherein each phosphor pixel has a light reflective material coating deposited on the first surface.

3. The detector as claimed in claim 2, wherein the reflective coating on the first surface is a low atomic number metal.

4. The detector as claimed in claim 2, wherein the atomic number of the reflective coating is less than 15.

5. The detector as claimed in claim 2, wherein each phosphor pixel has side surfaces and a layer of light reflective material coating said side surfaces.

6. The detector as claimed in claim 1, wherein the groove width is in the range from 4 $\mu$m to 30 $\mu$m.

7. The detector as claimed in claim 6, wherein the thickness of the substrate is approximately 1 mm.

8. The detector as claimed in claim 1, wherein each groove has an aspect ratio in the range from 5:1 to 150:1.

9. The detector as claimed in claim 1, wherein the X-ray fluorescent substrate is bonded directly to the light detecting pixel array via an index matched adhesive layer.

10. The detector as claimed in claim 9, wherein the thickness of the substrate is of the order of 1 mm.

11. The detector as claimed in claim 1, including a light guiding structure having a first end secured to the second surface of the substrate and a second end secured to the light detecting pixel array.

12. The detector as claimed in claim 11, wherein the x-ray fluorescent substrate comprises a thin layer of phosphor material.

13. The detector as claimed in claim 12, wherein the phosphor layer has a thickness in the range from 50 $\mu$m to 100 $\mu$m.

14. The detector as claimed in claim 12, including a layer of reflective material applied to the first surface of the substrate.

15. The detector as claimed in claim 11, wherein the light guiding structure comprises an array of micro-milled optical crystal pixels, each pixel in the optical crystal array being aligned with a respective phosphor material pixel.

16. The detector as claimed in claim 11, wherein the first surface of reticulated phosphor pixel array is secured to a substrate of material which is substantially transparent to x-rays, and the second surface is bonded to said light guiding structure.

17. The detector as claimed in claim 1, wherein the adhesive comprises an epoxy containing particulates of a material having a high atomic number, the particulate size being less than the groove width.

18. The detector as claimed in claim 17, wherein the metal is selected from the group consisting of tungsten, platinum and silver.

19. The detector as claimed in claim 1, wherein the pixel cross-section is in the range from 25 $\mu$m by 25 $\mu$m up to 250 $\mu$m by 250 $\mu$m.

20. The detector as claimed in claim 19, wherein the pixel cross-section is approximately 25 $\mu$m by 25 $\mu$m.

21. A detector for X-ray focal plane imaging, comprising:
    an X-ray fluorescent substrate having a first surface and a second surface, the first surface having grooves defining an array of micro-milled light-guiding phosphor pixels;
    a light reflective, adhesive material substantially filling the grooves between adjacent pixels;
    an array of visible light detecting pixels coupled to said second surface of said substrate for receiving light emanating from said substrate pixels;
    a light guiding structure having a first end secured to the second surface of the substrate and a second end secured to the light detecting pixel array;
    the x-ray fluorescent substrate comprising a thin layer of phosphor material; and
    the phosphor material being selected from the group consisting of $Gd_2O_2S$:Tb, $Gd_2O_2S$:Pr,Ce,F,ZnCdS:Ag, and $Y_2O_2S$:Eu.

22. A detector for X-ray focal plane imaging, comprising:
    an X-ray fluorescent substrate having a first surface and a second surface, the first surface having grooves defining an array of micro-milled light-guiding phosphor pixels;

a light reflective, adhesive material substantially filling the grooves between adjacent pixels;

an array of visible light detecting pixels coupled to said second surface of said substrate for receiving light emanating from said substrate pixels; and the X-ray fluorescent material being selected from the group consisting of $CdWO_4$, $Bi_4Ge_3O_{12}$, $YAG:Eu^{+3}$, YAG:Ce, $LuTaO_4$:Tb, $LuTaO_4$:Nb, $Y_2O_3$, CsI(Tl), CsI(Na), CsI, NaI, CsF, CaF(Eu), LiI(Eu), and $Gd_2SiOb$:Ce.

23. The detector as claimed in claim 22, wherein the substrate material is $Bi_4Ge_3O_{12}$.

24. The detector as claimed in claim 22, wherein the pixel cross-section is in the range from 25 μm by 25 μm to 250 μm by 250 μm.

25. An x-ray imaging system, comprising:

a support table of a material substantially transparent to x-rays for supporting an object to be imaged;

a support frame having first and second support arms on opposite sides of the object support table;

an x-ray source mounted on the first support arm for directing an x-ray beam towards the table;

an x-ray focal plane array imaging detector mounted on the second support arm facing the x-ray source for receiving an x-ray image of the object on the support table;

the x-ray focal plane array imaging detector comprising an X-ray fluorescent substrate having a first surface facing the table and a second surface, the first surface having grooves defining an array of elongated, micro-machined light-guiding phosphor pixels, each pixel having a cross-section in the range from 25 μm by 25 μm to 250 μm by 250 μm, a light reflective, adhesive material substantially filing the grooves between adjacent pixels, and an array of visible light detecting pixels coupled to said second surface of said substrate for receiving light emanating from said substrate pixels;

a data processing device connected to the output of the detector for producing an image.

26. The system as claimed in claim 25, wherein a plurality of x-ray focal plane array detectors are mounted in a side-by-side, butted arrangement on said second arm.

27. The system as claimed in claim 25 or claim 26, including a drive assembly for driving the aligned x-ray source and x-ray focal plane array imaging detector in perpendicular x and y directions, and a control unit for controlling operation of the drive assembly and x-ray source to drive the support frame and support table relative to one another in a step and repeat motion, whereby the drive assembly is actuated in incremental steps along a predetermined path to scan the aligned source and detector across the area of an object to be examined on the support table, the control unit further comprises means for stopping the drive after each step for a predetermined time period, and the x-ray source being actuated each time the drive assembly is stopped to produce an image in said detector, whereby successive small images of a larger object are gathered by said data processing device and combined to produce an overall image of the object.

28. The system as claimed in claim 27, wherein said support table has an array of fiducials at a spacing less than the size of each image, and the data processing unit is programmed to assemble the overall image by comparing and overlapping adjacent fiducial images in the individual images.

29. A method of producing x-ray images of an object, comprising the steps of:

placing an object to be examined on a support table of a material which is transparent to x-rays;

supporting an x-ray source and an x-ray focal plane imaging detector on a stand so that the source and detector are located on opposite sides of the table and an x-ray beam emitted by the source is aligned with the detector, the x-ray focal plane array imaging detector comprising an X-ray fluorescent substrate having a first surface facing the table and a second surface, the first surface having grooves defining an array of elongated, micro-machined light-guiding phosphor pixels of uniform cross-sectional dimensions along their length, a light reflective, adhesive material substantially filing the grooves between adjacent pixels, and an array of visible light detecting pixels coupled to said second surface of said substrate for receiving light emanating from said substrate pixels;

moving the aligned source and detector together in incremental steps along a predetermined path covering the entire object area in a predetermined stop and repeat pattern, stopping the motion for a predetermined interval after each step; actuating the x-ray source each time the stand and table are stopped to produce an x-ray image of the object at that position;

receiving a series of successive images for each stop position and processing the images to produce a combined image of the object area.

30. A detector for X-ray focal plane imaging, comprising:

an X-ray fluorescent substrate having a first surface and a second surface, the first surface having grooves defining an array of micro-milled light-guiding phosphor pixels, each groove having a width in the range from 4 μm to 15 μm along its entire length;

a light reflective, adhesive material substantially filling the grooves between adjacent pixels; and an array of visible light detecting pixels coupled to said second surface of said substrate for receiving light emanating from said substrate pixels.

31. The detector as claimed in claim 30, wherein the groove width is less than 6 μm.

* * * * *